United States Patent
Missakian

(10) Patent No.: US 7,934,755 B2
(45) Date of Patent: May 3, 2011

(54) OMELET SPATULA AND COOKING METHOD

(76) Inventor: Craig Missakian, Los Angeles, CA (US)

( * ) Notice: Subject to any disclaimer, the term of this patent is extended or adjusted under 35 U.S.C. 154(b) by 557 days.

(21) Appl. No.: 11/937,881

(22) Filed: Nov. 9, 2007

(65) Prior Publication Data
US 2009/0123624 A1    May 14, 2009

(51) Int. Cl.
*A47J 43/28* (2006.01)
(52) U.S. Cl. .............................. 294/7; D7/688
(58) Field of Classification Search .............. 294/7, 8, 294/49; D7/689, 688; 99/422–425; 426/523
See application file for complete search history.

(56) References Cited

U.S. PATENT DOCUMENTS

| | | | |
|---|---|---|---|
| 924,535 A * | 6/1909 | Cottet | 294/7 |
| 2,081,165 A * | 5/1937 | Bretney | 294/7 |
| 2,485,521 A * | 10/1949 | Wendt | 294/7 |
| 2,641,496 A * | 6/1953 | Benezet et al. | 294/1.1 |
| 3,004,341 A * | 10/1961 | Carroll et al. | 30/325 |
| 3,759,165 A | 9/1973 | Wallace | |
| 4,773,318 A | 9/1988 | Furletti | |
| D396,389 S | 7/1998 | Durbin | |
| 6,024,391 A * | 2/2000 | Horn | 294/7 |
| 6,135,017 A * | 10/2000 | Wang et al. | 99/499 |
| D444,042 S | 6/2001 | Kortleven et al. | |
| D459,955 S | 7/2002 | King | |
| D477,191 S * | 7/2003 | Bull et al. | D7/692 |
| 2006/0011072 A1 | 1/2006 | Giornali et al. | |

FOREIGN PATENT DOCUMENTS

WO    98/53727    12/1998

* cited by examiner

*Primary Examiner* — Dean J Kramer
(74) *Attorney, Agent, or Firm* — Renner, Otto, Boisselle & Sklar, LLP

(57) ABSTRACT

An omelet spatula includes a handle and a body. The body is attached to the handle and includes a surface in the shape of half of a cooking food, having an inner edge and an outer edge that meet at each end. The shape of the spatula allows the user to easily fold the cooking food over itself, for example, as when cooking an omelet. The spatula is configured to remain in the cooking pan, underneath half of the omelet, until the omelet is folded. Also, a cooking method using the spatula is described.

3 Claims, 2 Drawing Sheets

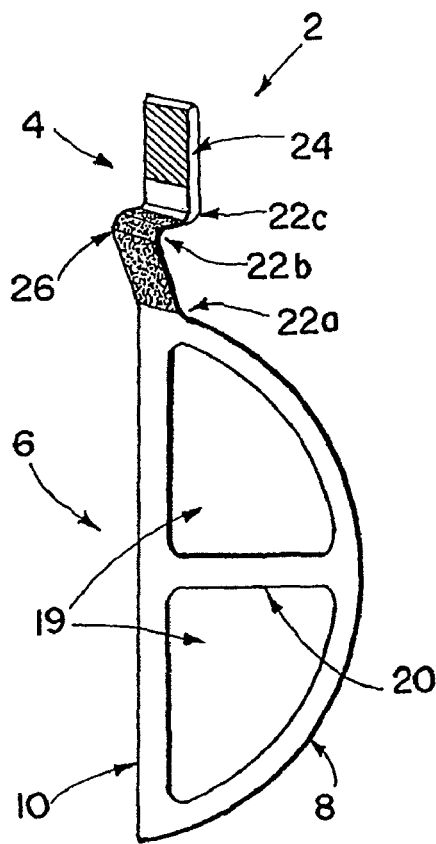
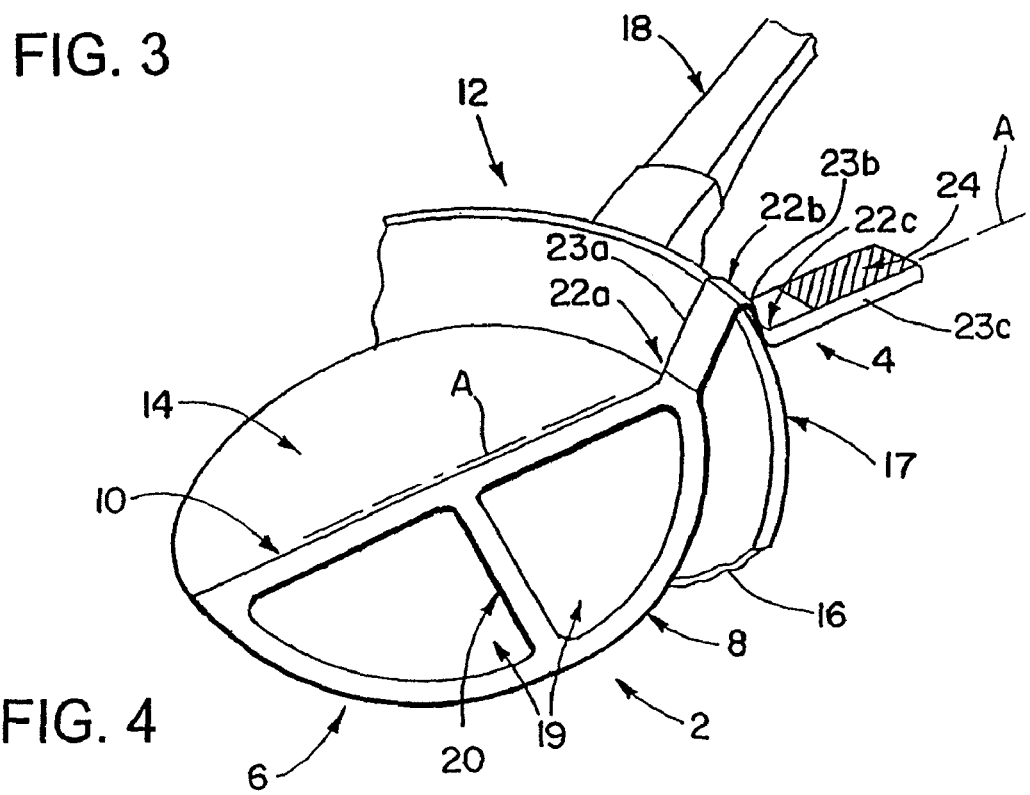

OMELET SPATULA AND COOKING METHOD

TECHNICAL FIELD

The present invention relates to a spatula and a method of cooking with the spatula. More particularly, the invention relates to an omelet spatula and a method of cooking omelets, crepes, and the like.

BACKGROUND

Spatulas are used while cooking many different foods. Typically, the user of a spatula would like to break the food away from the cooking pan, slide the spatula underneath the food, and flip or fold the food, all without tearing or breaking the food apart.

An omelet can be a particularly difficult food to prepare. It is usually folded over itself during cooking in a cooking pan, forming the shape of about half of the cooking pan. It can be difficult for a typical spatula, for example, with a straight leading edge, to lift and fold the omelet without breaking the omelet apart. For example, a spatula's straight leading edge may not conform to a curved wall of the cooking pan and can cut or distort the omelet as it is lifted and folded.

SUMMARY

According to several aspects of the invention, a spatula and method of cooking using a spatula, where the spatula rests underneath an omelet and on top of a cooking surface at the beginning of the cooking process, allowing the user to fold the omelet easily during the cooking process.

According to one aspect of the invention, a spatula including a handle and a body, wherein the body is attached to the handle and the body includes a surface approximately one half the shape of a cooking food, having an inner edge and an outer edge that meet at each end.

According to another aspect of the invention, a spatula wherein the surface of the body includes material only along a periphery of the body, therein resulting in an open area inside of the periphery of the body.

According to another aspect of the invention, a spatula wherein the surface of the body includes material forming at least one cross member connecting opposite sides of the periphery of the body.

According to another aspect of the invention, a spatula wherein the handle includes at least one bend of a size and shape suitable for conforming to a side of a cooking surface.

According to another aspect of the invention, a spatula wherein the handle includes at least one length of a size and shape suitable for conforming to a side of a cooking surface.

According to another aspect of the invention, a spatula wherein the handle includes a grip to provide a surface suitable for grasping.

According to another aspect of the invention, a spatula including an intermediate section located in between the handle and the body to insulate the handle from heat transferred to the body from a cooking surface.

According to another aspect of the invention, a method of cooking using a spatula, including the steps of placing the spatula on a cooking surface, putting a food on the cooking surface, wherein at least some of the food covers a body of the spatula, heating the food, wherein the spatula remains on the cooking surface, underneath at least some of the food, folding the food covering the spatula onto the food not covering the spatula on the cooking surface using the spatula, and removing the spatula from the cooking surface.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

In the annexed drawings, which are somewhat schematic and not necessarily to scale:

FIG. 3 is a schematic illustration, partly as a top plan view and partly as a perspective view showing a spatula in accordance with another embodiment of the invention; and FIG. 4 is an illustration showing the spatula in a cooking pan in accordance with another embodiment of the invention.

DETAILED DESCRIPTION OF EMBODIMENTS

Figure 1:
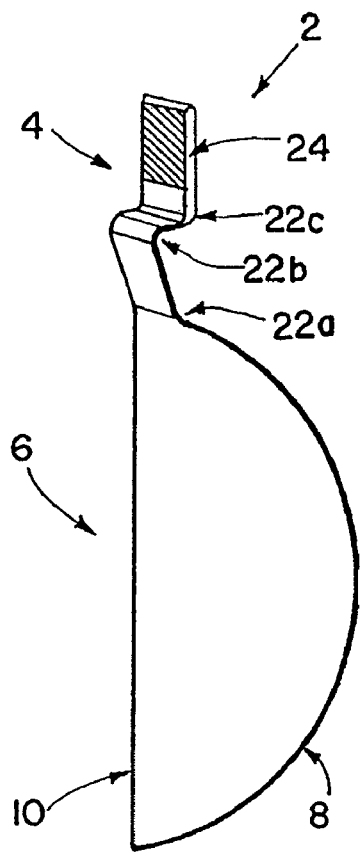
FIG. 1 is a schematic illustration, partly as a top plan view and partly as a perspective view showing a spatula in accordance with an embodiment of the invention.

The present invention is directed to a cooking utensil that allows a user easily to fold a food during cooking. The embodiment described in detail below is directed to the cooking of omelets, but the present invention also may be used while cooking any food that can be folded, for example, crepes, other types of eggs, tortillas, etc. For the sake of brevity in the description, the food will be referred to as an omelet.

The present invention applies to cooking utensils that fold or turn food during cooking. Similar cooking utensils for this function have various names, for example, spatula, flipper, turner, or scraper. For the sake of brevity in the description, the cooking utensil of the present invention is described as a spatula, but the description applies to any similar device. A typical spatula has a handle and a rectangular grid-like, flat surface that is less than the size of a pan bottom.

In the following description, numerous specific details are described, e.g., cooking techniques, cooking processes, etc., in order to provide a thorough understanding of the invention. Those familiar with food preparation will recognize that the present invention may be practiced apart from these specific details. In addition, one of ordinary skill in the art of cooking will appreciate that there are many types of cooking surfaces, for example, cooking pan, fry pan, griddle, sheet, skillet, spider, and the like. For the sake of brevity in the description, the cooking surface is described primarily as a cooking pan, but applies to any similar device.

The spatula of the present invention allows the user easily to fold an omelet. When using a cooking pan, egg batter poured into the pan forms a shape similar to the shape of the bottom of the pan. Folding half of the egg batter over itself during cooking yields an omelet approximately one half the shape of the cooking pan bottom. The spatula of the present invention has a shape that is similar to the portion of the omelet that will be folded. The spatula allows the user to cook the omelet with the spatula in the pan and underneath a portion of the omelet during the beginning of the cooking process. When the omelet is ready to be folded, the spatula is already in position under the appropriate portion of the omelet. Since the spatula has a shape similar to the portion of the omelet that will be folded, even pressure can be applied to the underside of that portion of the omelet during the folding process to avoid breaking apart or tearing the omelet. Once the omelet is folded, the spatula may be removed from the pan. In one embodiment, the spatula's surface area in contact with the pan is limited to a narrow periphery, allowing more of the omelet to cook directly on the surface of the cooking pan. The spatula also may have one or more cross members (i.e. ribs or struts) to help support part of the omelet as it is folded, while still allowing a substantial part of the omelet to cook directly on the surface of the cooking pan before being folded.

Referring now in detail to the drawings, wherein like reference numerals designate like parts in the figures, and initially to FIG. 1, an exemplary spatula 2 is shown in accordance with an embodiment of the present invention. The spatula 2 includes a handle 4 section and a body 6 section. The handle 4 and body 6 are attached to each other and together form the spatula 2.

The spatula 2 may be formed as one piece, for example, using an injection molding or stamping process, or may be a combination of one or more pieces attached to each other. The materials used to form the spatula 2 are suitable to withstand relatively high temperatures, exposure to various cooking environments (e.g., food ingredients, cooking oils, pan materials and coatings, etc.), and exposure to various cleaning environments (e.g., chemicals, dishwashers, etc.). For example, the body 6 and the handle 4 may be constructed of materials suitable for prolonged direct exposure to cooking temperatures. The spatula 2 may be produced using a variety of materials including, but not limited to, metal, plastic, rubber, and wood, for example. Each material may offer its own particular advantages and disadvantages.

In addition to one-piece or single material configurations, producing different portions of the spatula 2 using different materials also is possible. For example, both the handle 4 and the body 6 may be produced with plastic, the handle 4 may be produced from wood while the body 6 is produced from metal, or any other combinations that may be useful. If desired, an intermediate section may be provided between the handle 4 and the body 6, for example, to provide thermal insulation that allows the handle 4 to remain cool enough to grasp manually while the body 6 gets hot during a cooking process.

Still referring to FIG. 1, the body 6 has a thin surface in a shape similar to the portion of the omelet that will be folded. For example, the shape of the body 6 may be a half-circle when the cooking surface of the pan is circular, half-oval when the pan is elliptical, or any other shape that will simulate the shape of the omelet portion to be folded. In the case of cooking on a griddle, or other large cooking surface, the shape of the body 6 may be, for example, half-circle, half-oval, rectangular, or any other shape sufficient to fold approximately half of the cooking egg batter. In some applications, the body 6 may be larger or smaller than the portion of the omelet to be folded. The shape of the body 6 is formed by an outer edge 8 and an inner edge 10 that come together at each end.

The body 6 is shown attached to the handle 4. The handle 4 extends from the body 6 and provides a surface for the user to grasp the spatula 2. The size, shape, and orientation of the handle 4 are suitable for grasping by the user with one hand while cooking.

Figure 2:
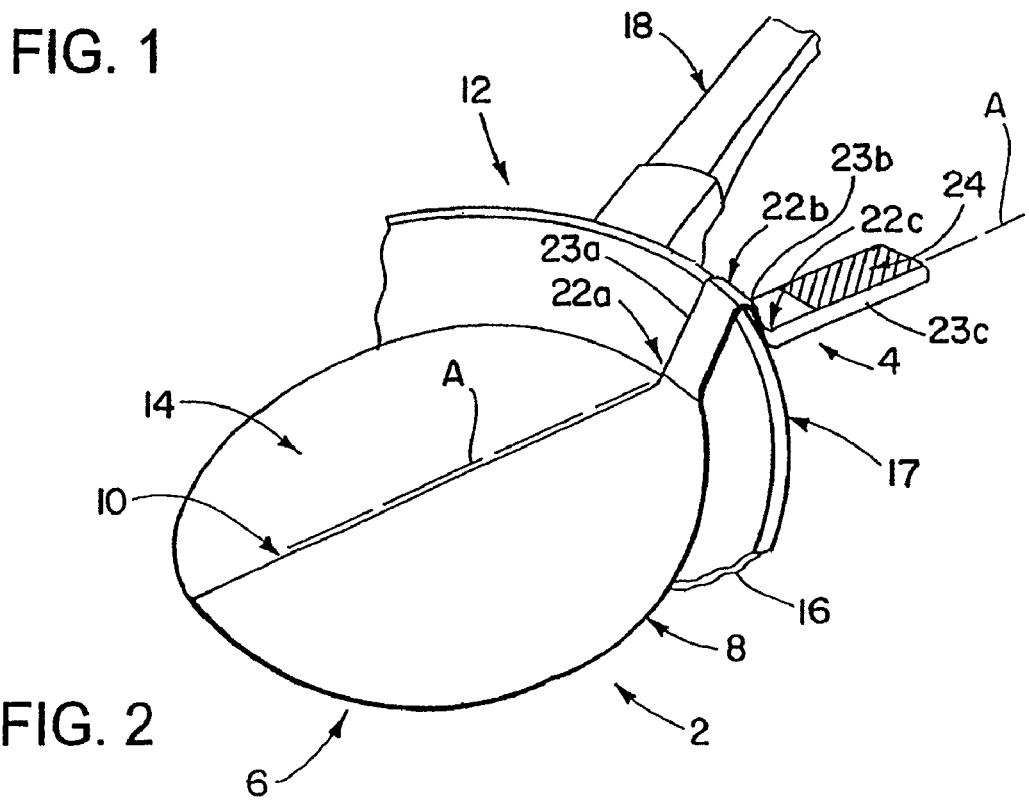
FIG. 2 is an illustration showing the spatula in a cooking pan in accordance with an embodiment of the invention.

Referring now to FIG. 2, the spatula 2 is shown in an exemplary cooking pan 12. The cooking pan 12 has a pan bottom 14 that has an exemplary circular shape, which is typical for frying pans. The body 6 of the spatula 2 is shown resting on the pan bottom 14. The outer edge 8 of the body 6 is aligned near the perimeter of the pan bottom 14. The cooking pan 12 also includes a side or side wall 16 having a top edge 17. Note that side 16 could be, for example, a step, ledge, or other feature of a griddle, or other cooking surface. The pan side 16 extends up from the pan bottom 14 to contain the contents of the cooking pan 12. A pan handle 18 may attach to the pan side 16 or pan bottom 14 for handling and manipulating of the cooking pan 12.

As shown in FIG. 2, when the body 6 of the spatula 2 is placed in the cooking pan 12, the outer edge 8 of the spatula 2 will closely match the shape of the perimeter of the pan bottom 14. The inner edge 10 of the spatula 2 lies approximately across the center of the pan bottom 14. For example, in the case of a circular cooking pan 12, the inner edge 10 would be approximately across a diameter of the pan bottom 14. In this position, the body 6 of the spatula 2 occupies approximately half of the pan bottom 14 area. Consequently, when a sufficient volume, for example, enough to cover the pan bottom 14, of a liquid food to be cooked, such as an egg batter, for example, is put into the cooking pan 12, the body 6 of the spatula 2 will rest underneath approximately half of the egg batter.

In this manner, the body 6 of the spatula 2 remains under half of the egg batter while the egg batter starts to cook in the cooking pan 12, and the other half of the egg batter cooks directly on the pan bottom 14. In one embodiment, as shown in FIG. 2, the body 6 material is thin and conducts heat from the pan bottom 14 such that the egg batter above the body 6 is heated enough for cooking. Surface to surface contact between the body 6 and the pan bottom 14 allows for good thermal transfer, e.g., where the body 6 is as flat as the pan bottom 14 or otherwise contoured as the pan bottom 14. In FIGS. 1-2, the body 6 is thermally conductive to transfer heat to the cooking egg batter.

After sufficient cooking time, which is determined by the user, the handle 4 of the spatula 2 is grasped and then is lifted and/or rotated by the user to fold the portion of the cooking egg batter that is above the body 6 of the spatula 2 onto the portion of the cooking egg batter that was not covering the body 6 of the spatula 2, making an omelet shape. For example, by using the spatula 2, a circular cooking pan 12, and following this process, the user of the spatula 2 easily can fold a circular-shape, partially-cooked egg batter into a half-circle shape omelet.

The user of the spatula 2 is able to fold the omelet in such a way that minimizes tearing of the omelet during the folding process. By using the spatula 2, lifting pressure is distributed throughout the portion of the omelet above the body 6 that is lifted during folding. Consequently, tearing of the omelet due to uneven lifting pressure is minimized. Also, since the body 6 of the spatula 2 is already present under the portion of the omelet to be folded during cooking, there is no risk of tearing apart the omelet while trying to get the spatula 2 under the omelet before folding. In addition, the present invention eliminates the need to lift and maneuver the cooking pan 12 while attempting to get the spatula 2 under the omelet. After folding the omelet, the spatula 2 may be removed form the cooking pan 12.

It should be apparent that the body 6 of the spatula 2 does not need to match the exact dimensions of half of the pan bottom 14. The purpose of the body 6 of the spatula 2 is to lift and fold half of the cooking egg batter to form an omelet. A spatula 2 with a body 6 that is somewhat smaller than a particular pan bottom 14 may be sufficient to lift and fold the omelet properly without tearing. In this way, the spatula 2 may be used in several different size cooking pans 12. Desirably, the spatula 2 is small enough to rest against the pan bottom 14 of the cooking pan 12 during cooking.

In a related embodiment, as shown in FIGS. 3-4, the body 6 of the spatula 2 may include material only along a periphery of the body 6. This embodiment results in open area 19 inside of the periphery. In this configuration, the outer edge 8 and the inner edge 10 are formed by a narrow width of thin material. The spatula 2 may also include one or more ribs or cross members 20 connecting opposite sides of the body 6 periphery. Together, the outer edge 8, inner edge 10, and optional cross member(s) 20 provide enough support to lift and fold the omelet without tearing. The advantage of this embodiment, when compared to the embodiment with a solid body 6, is that more of the cooking egg batter, located where the body 6 of the spatula 2 is resting, may make direct contact with the pan bottom 14 and have direct exposure to heat from the pan bottom 14. This configuration may allow for faster and more even cooking of the omelet. Although the body 6 shown in FIGS. 3-4 may be thermally conductive for the same reason described in relation to the embodiment in FIGS. 1-2, alternatively, it could be not so thermally conductive since it has the open area 19.

The cross member 20 is also formed by a narrow width of thin material. The cross member 20 provides additional support to the omelet during the folding process. The spatula 2 shown in FIGS. 3 and 4 shows one cross member 20 passing through the middle of the open area 19 of the body 6, connecting the outer edge 8 to the inner edge 10, wherein the cross member 20 is perpendicular to the inner edge 10. Another embodiment (not shown) may have plural cross members 20, all perpendicular to the inner edge 10, spaced in a parallel configuration from one end of the body 6 to the other end. In yet another embodiment (not shown), one or more cross members 20 may connect one side of the outer edge 8 to the other side of the outer edge 8, all running parallel to the inner edge 10. Another embodiment (not shown) may have plural cross members 20 arranged in a "sun beam" pattern, all emanating from a midpoint of the inner edge 10 to approximately evenly spaced points along the outer edge 8. These patterns form a grid-like surface as the body 6. As will be appreciated, the quantity, size, and configuration of cross members 20 are not limited and these and any other combinations and variations thereof are included in the invention.

In another embodiment, the handle 4 of the spatula 2 may include one or more bends 22. As shown in FIGS. 1-4, the bends 22 in the handle 4 may start at the location where the handle 4 connects to the body 6 and may continue towards the end of the handle 4 opposite the body 6. Referring to FIGS. 2 and 4, the bends 22 allow the handle 4 to conform to the shape of the pan side 16 of the cooking pan 12. In this manner, the body 6 of the spatula 2 can rest in the pan bottom 14 without interference between the handle 4 and the pan side 16. Also, the bends 22 may allow the handle 4 of the spatula 2 to rest against the pan edge 17 for stability during cooking, without falling in or sliding into the cooking pan 12. For example, the bends 22 may bend over the pan edge 17 and down along the pan side 16, such that the interference between the handle 4 and the cooking pan 12 prevents the spatula 2 from sliding down.

Referring to FIGS. 1-4, the handle 4 of the spatula 2 is shown with three exemplary bends 22. A first bend 22a is shown where the handle 4 attaches to the body 6, at an approximate angle of 60 degrees up from the body 6 plane. As shown in FIGS. 2 and 4, this bend 22a allows the body 6 of the spatula 2 to rest in the pan bottom 14 without interference from the handle 4. A second bend 22b is shown above the top of the pan edge 17, forming an approximate angle of 60 degrees with the first bend 22a. A third bend 22c is shown outside of the cooking pan 12, at an approximate angle of 60 degrees up from the plane of the portion of the handle 4 farthest from the body 6. The second and third bends 22b, 22c direct the handle 4 into a comfortable and effective position for the user to grasp and manipulate the spatula 2 during cooking and folding and prevent the handle 4 from sliding into the cooking area of the cooking pan 12.

The bends 22 also form lengths 23. Together, the bends 22 and lengths 23 provide spatula 2 stability with the cooking pan 12 and facilitate spatula 2 control to fold the omelet without tearing. Length 23a lies flat against the pan side 16 providing spatula 2 stability by restricting movement during cooking. Length 23b extends down to cooperate with length 23a and bends 22 to secure the spatula 2 to prevent movement or jostling, etc. Length 23b and bends 22 also allow length 23c to be in the same plane as the body 6 for optimum control and accuracy during cooking, such that the user does not tear apart the omelet during folding, burn himself by contacting a hot surface, etc.

During the folding process, the spatula 2 is rotated about an imaginary axis A (see dotted line in FIGS. 2 and 4) located approximately along the inner edge 10 of the spatula 2. When length 23c of the handle 4 is centered about the imaginary axis A and coplanar with the body 6, the user can easily control the spatula 2 during the folding process. For example, if length 23c of the handle 4 is approximately centered on the imaginary axis A and close to being coplanar with the body 6, the user of the spatula, while grasping the length 23c of the handle 4, only has to slightly lift and rotate the spatula 2 to fold the omelet. In contrast, and common with most typical spatulas, where the graspable portion of the handle is off-axis with the folding edge (e.g. perpendicular) and not coplanar with the surface of the spatula (e.g. at an upward angle), it may be difficult for the user to fold the omelet. For example, the user of a typical spatula may have to slide the leading edge of the spatula half-way under the omelet, such that the handle grip is perpendicular relative to the folding axis of the leading edge, requiring a relatively difficult "over-the-top" folding maneuver by the user. As will be appreciated, the bends 22 and lengths 23 of the spatula 2 are configured to allow easy folding of the omelet, requiring a slight lift and rotation with the user's wrist.

In addition, the quantity, size, shape, and configuration of bends 22 and lengths 23 are not limited and any combinations thereof are covered by this description. For example, the spatula 2 may be configured with a large bend 22 to allow for use with a cooking pan 12 with a large pan side 16 or the spatula 2 may include four bends and additional lengths 23 to accommodate a cooking pan 12 with a thick pan edge 17.

In another embodiment, the handle 4 of the spatula 2 may include a grip 24. As shown in FIGS. 1-4, the grip 24 of the handle 4 may provide a more comfortable and/or ergonomic graspable area for the user of the spatula 2. The grip 24 may be of or include a material different than the material of the handle 4, or may be formed into the handle 4 using the same material. The grip 24 may also be used to insulate the user's hand from heat conducted into the handle 4 from the cooking pan 12. In addition, a separate intermediate insulation part 26, as shown in FIG. 3, may replace part of the handle 4 to insulate the grip 24 area from the heat conducted and/or radiated into the body 6.

While this invention has been described with respect to various examples and embodiments, it is to be understood that the invention is not limited to only those embodiments and that it can be variously practiced within the scope of the following claims.

What is claimed is:

1. A spatula, comprising:
a handle; and
a body,
wherein the body is attached to the handle,
wherein the body is generally planar and has a shape approximately one half the shape of a cooking food,
the body having an inner edge and an outer edge that meet at each end and together form a periphery of the body, and the body having at least one cross member connecting opposite inner and outer edges of the periphery of the body,
open areas inside of the periphery of the body to allow cooking food to engage directly with the surface of a cooking utensil in which the food is being cooked,
the handle having first and second bends, the first bend extending upward from the plane of the body to provide a handle portion that extends upward from the plane of the body and the second bend extending downward toward the plane of the body to provide a handle portion that extends downward toward the plane of the body,
the handle including a grip to provide a surface suitable for grasping,
the bends and the upward and downward handle portions being between the body and the grip,
wherein the grip has a central axis that extends in a direction that is generally coaxial with the inner edge of the body to facilitate rotating the spatula to flip cooking food that is on the body during cooking of the food.

2. The spatula according to claim 1, wherein the handle bends and upward and downward handle portions are of a size and shape suitable for conforming to a side of a cooking utensil.

3. The spatula according to claim 1, further comprising an intermediate section located in between the handle grip and the body to insulate the handle grip from heat transferred to the body while the body is in a cooking utensil during cooking of food.

\* \* \* \* \*